United States Patent [19]
Thune

[11] 3,782,759
[45] Jan. 1, 1974

[54] SAFETY ARMS FOR TRAILER HITCH

[76] Inventor: Gerald E. Thune, Rt. 2, Sacred Heart, Minn. 56285

[22] Filed: Oct. 13, 1972

[21] Appl. No.: 297,401

[52] U.S. Cl.............................. 280/457, 280/432
[51] Int. Cl.............................................. B60d 1/12
[58] Field of Search................... 280/457, 456, 474, 280/446 R, 432

[56] References Cited
UNITED STATES PATENTS

| | | |
|---|---|---|
| 2,251,656 | 8/1941 | Botelho.............................. 280/457 |
| 2,464,392 | 3/1949 | Heavener........................... 280/457 |
| 2,689,750 | 9/1954 | Van Horn.......................... 280/457 |
| 2,775,468 | 12/1956 | Holsclaw........................... 280/457 |

Primary Examiner—Leo Friaglia
Attorney—Carlson, Carlsen & Sturm

[57] ABSTRACT

For use with a conventional trailer hitch wherein a forwardly extending tongue on a trailer is pivotally connected on a vertical main hitch axis to a support on the rear of a towing vehicle. A pair of safety links or arms extend fore and aft from each side of the tongue to the support where they are pivoted on each side of the hitch axis. The arms are longitudinally telescopic to extend and retract as the trailer moves about the hitch axis and the arm ends are connected on rigid vertical axes to the tongue and support to provide an effective traveling hitch connection should the main hitch connection be severed.

2 Claims, 4 Drawing Figures

SAFETY ARMS FOR TRAILER HITCH

BACKGROUND OF THE INVENTION

A conventional vehicle-trailer hitch generally embodies a ball and socket joint, a hitch pin, a hook and eye or some other structure which provides a vertical pivotal connection between the trailer and the towing vehicle. Such a pivotal connection is necessary for relative articulation between the two vehicles during travel. If the hitch were to disconnect or some element thereof break so as to sever the connection during travel, a very dangerous situation would occur as the moving trailer would no longer be under the control of the towing vehicle.

It is accordingly desirable, and in fact in most localities legally required, that some safety device would be provided to maintain a towing connection between the towing vehicle and trailer in the event that the main hitch connection is broken. Most generally this safety device is in the form of a chain or some other flexible connection between the trailer tongue and rear bumper or bumper supporting brackets of the towing vehicle. The problem with this type of safety connection is its looseness or flexibility which may allow the trailer to swing from side to side or allow the trailer tongue fall upon the road surface.

SUMMARY OF THE INVENTION

The object of the present invention is to provide a hitch with a pair of safety arms connecting the towing and towed vehicles on opposite sides of the hitch axis to maintain a connection between the vehicles even though the main hitch became uncoupled or broken and which connection allows limited relative movement between the vehicles about a vertical axis but which is rigid against any substantial relative movement between the vehicles about a horizontal axis.

With this and other objects in view the invention broadly comprises a pair of elongated safety arms extending fore and aft on either side of the hitch with the rear ends thereof pivoted on vertical pivots to the trailer tongue and the forward ends pivoted on vertical pivots to the towing vehicle, each arm comprising an elongated square tubular sleeve with a square bar having a sliding telescopic fit therein so that the arm may longitudinally extend and contract, the bar having a slot extending longitudinally therealong and a bolt extending through the sleeve and said slot to limit said extension and contraction of the arm.

DESCRIPTION OF THE PREFERRED EMBODIMENT

Figure 1:
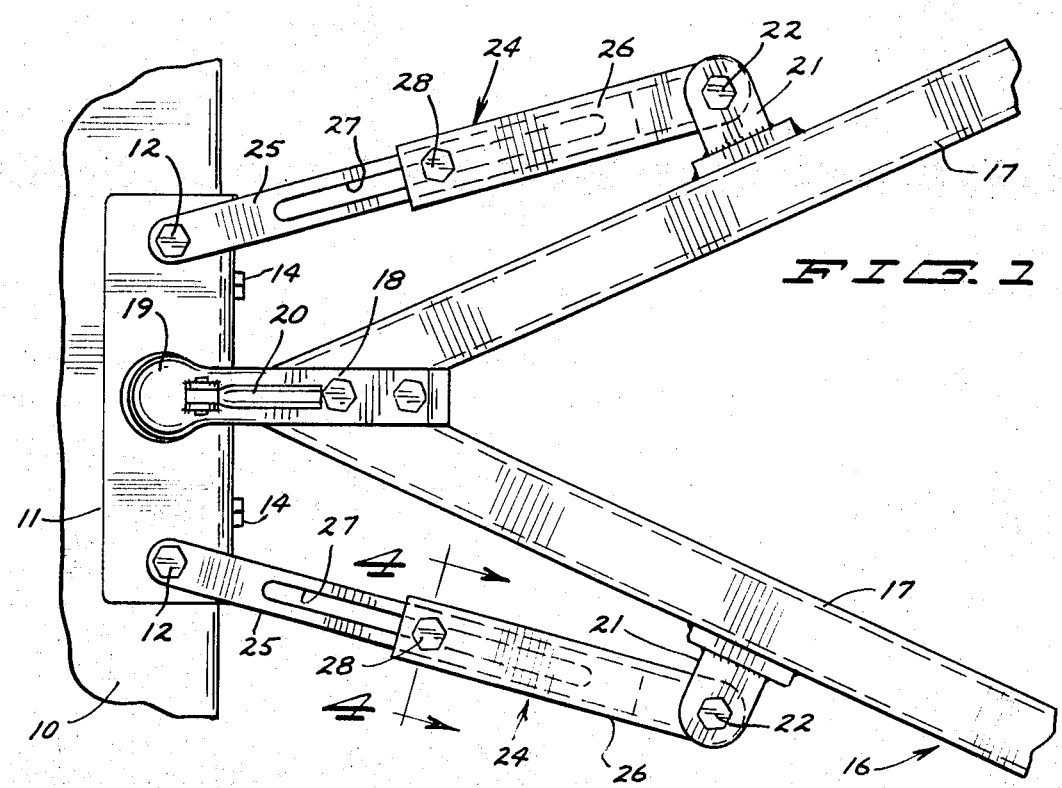
FIG. 1 is a plan view of a ball and socket hitch and the safety arms in normal draft position hitching a trailer tongue to a towing vehicle.
Figure 2:
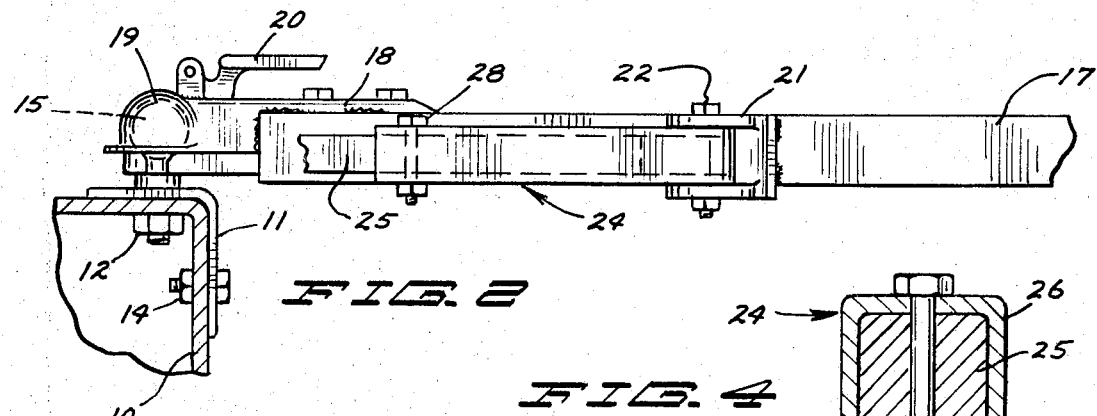
FIG. 2 is a side elevation of the hitch in the condition of FIG. 1 with the near safety arm partially broken away.
Figure 4:
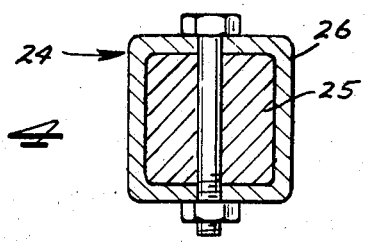
FIG. 4 is a vertical section through one of the safety arms taken on line 4—4 of FIG. 1.

Referring now more particularly to the drawing, reference numerals will be used to denote like parts or structural features in the different views. The number 10 denotes the rear bumper or frame members of an automobile or other towing vehicle. An angle iron bracket 11 is mounted on the member 10 as by transversely spaced vertical bolt and nut assemblies 12 and fore and aft extending bolt and nut assemblies 14. Bracket 11 has a conventional hitch ball fitting 15 mounted to extend upwardly from the transverse center thereof.

A V-shaped tongue 16 is formed of converging frame members 17 which extend forwardly from a trailer vehicle. A hitch bar 18 is mounted on tongue 16 and has a downwardly opening socket 19 at its forward end and a manually releasable locking device 20 for suitably connecting the socket 19 to fitting 15 to allow limited universal movement therebetween. As thus far described the hitch structure is relatively conventional, it being understood that a safety chain might be used to connect the members 10 and 16 to hold the two vehicles together in the event that members 15 and 19 should become disengaged.

A double eared bracket 21 is mounted to extend outwardly from each of the frame members 17. Each of these brackets 21 is connected as by bolt and nut assembly 22 with the rear end of an extensible safety arm, denoted generally at 24, the front end of the arm being secured to the bracket 11 by the adjacent bolt and nut assembly 12.

Each arm 24 comprises a steel bar or tube 25 having a square cross sectional outer dimension having a longitudinal sliding fit or telescopic fit within an elongated square tubular sleeve 26 with such members being respectively pivoted to nut and bolt assemblies 12 and 22. Each member 25 has an elongated slot 27 extending vertically therethrough which slidably receives the nut and bolt assembly 28 extending vertically through the sleeve 26 in telescopic relation therewith.

The member 25 in each arm 24 is freely slidable within the sleeve 26 and the purpose of the assembly 28 in each arm 24 is merely to limit extension or contraction of the arm. It will be understood that during tandem towing travel the trailer and its draft tongue 16 will pivot about the vertical axis of fitting 15. As this occurs one arm 24 will contract as the opposite arm extends within the limits afforded by the assembly 28.

Figure 3:
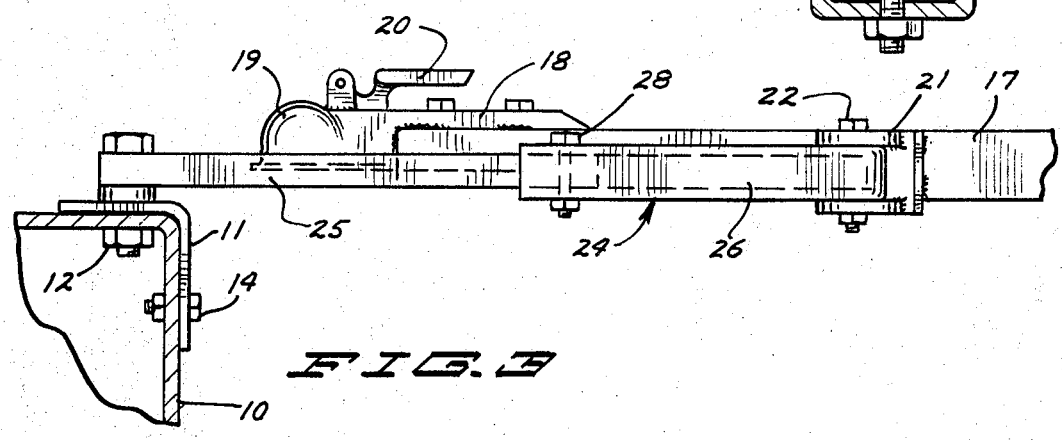
FIG. 3 is a side elevation similar to FIG. 2 but with the ball and socket hitch disconnected.

The pivotal connections of the arms 24 at both points 12 and 22 are rigidly fixed on vertical axis so that there is no vertical play between the arm and brackets 11 or 21. Also the sliding telescopic fit between members 25 and 26 is relatively tight. Accordingly, in the event that the socket member 19 should disconnect from the ball fitting 15, or the hitch connection between the tongue 16 and ball 15 be otherwise broken during travel, the arms 24 will both extend but still hold the tongue 16 in elevated position, as shown in FIG. 3. Arms 24 will accordingly preserve the draft connection until such time as the primary hitch 15, 19 can be reconnected or repaired. While the slot 27 and bolt 28 could be disposed on the horizontal, the vertical arrangement is preferred as it does not materially weaken the load bearing strength of the arm 24.

Having now therefore fully illustrated and described my invention, what I claim as new and desire to protect by United States Letters Patent is:

1. A pair of safety arms for use with a trailer hitch wherein a trailer vehicle is provided with a hitch means at its forward end adapted to be connected on a vertical pivot hitch axis to the rear end of a towing vehicle, said arms adapted to extend in a fore-and-aft direction between the vehicles one on each side of said hitch axis and each arm comprising;
- a. an elongated tubular sleeve which is square in cross section,
- b. an elongated square bar having a sliding telescopic fit with the sleeve for extension or contraction of the length of the arm,
- c. the bar having an elongated slot therethrough extending longitudinally thereof,
- d. a stop bolt extending through the sleeve and said slot to limit said extension and contraction movement,
- e. means for pivotally connecting the extended end of the sleeve to one of said vehicles and the extended end of the bar to the other of said vehicles with both of said pivots being on fixed vertical axes.

2. The subject matter of claim 1 wherein said stop bolt is parallel to said fixed vertical axes and said extended end pivots on each arm being located at identical points on the vehicles at opposite sides of the hitch axis.

* * * * *